(12) United States Patent
Woodruff

(10) Patent No.: US 12,367,295 B2
(45) Date of Patent: Jul. 22, 2025

(54) ELECTRONIC CHIP AND A METHOD FOR PROVISIONING SUCH AN ELECTRONIC CHIP

(71) Applicant: Secure Thingz Ltd., Cambridge (GB)

(72) Inventor: Tim Woodruff, Cambridge (GB)

(73) Assignee: SECURE THINGZ LTD., Cambridge (GB)

( * ) Notice: Subject to any disclaimer, the term of this patent is extended or adjusted under 35 U.S.C. 154(b) by 121 days.

(21) Appl. No.: 17/903,688

(22) Filed: Sep. 6, 2022

(65) Prior Publication Data

US 2023/0071782 A1 Mar. 9, 2023

(51) Int. Cl.
*G06F 21/60* (2013.01)
*G06F 21/62* (2013.01)

(52) U.S. Cl.
CPC .......... *G06F 21/602* (2013.01); *G06F 21/606* (2013.01); *G06F 21/6218* (2013.01)

(58) Field of Classification Search
CPC ... G06F 21/602; G06F 21/606; G06F 21/6218
See application file for complete search history.

(56) References Cited

U.S. PATENT DOCUMENTS

| | | | | |
|---|---|---|---|---|
| 9,980,140 | B1* | 5/2018 | Spencer | H04W 12/02 |
| 2006/0085352 | A1* | 4/2006 | Hug | H04N 21/44204 |
| | | | | 348/E7.07 |
| 2008/0005588 | A1* | 1/2008 | Watson | G06F 21/6218 |
| | | | | 713/193 |
| 2010/0169546 | A1 | 7/2010 | Van Acht et al. | |
| 2013/0142031 | A1* | 6/2013 | Wu | H04L 27/2626 |
| | | | | 370/203 |
| 2013/0163764 | A1 | 6/2013 | Van Den Berg et al. | |
| 2016/0125187 | A1 | 5/2016 | Oxford | |

FOREIGN PATENT DOCUMENTS

| | | |
|---|---|---|
| CN | 112329038 A | 2/2021 |
| EP | 3316168 A1 | 5/2018 |

OTHER PUBLICATIONS

Search Report from corresponding European Application No. 21195279.1, Feb. 10, 2022.

* cited by examiner

*Primary Examiner* — Gil H. Lee
(74) *Attorney, Agent, or Firm* — Workman Nydegger

(57) ABSTRACT

An electronic chip for assembly into electronic equipment includes a communication interface configured to receive a plurality of blocks of provisioning data from a provisioning apparatus in encrypted form. The electronic chip has a non-volatile memory configured to store the plurality of blocks of provisioning data. The electronic chip further includes a processing circuitry configured to perform a plurality of operations substantially in parallel, such that the plurality of operations includes a first operation of decrypting a first encrypted block of the plurality of blocks of provisioning data and a second operation of writing a second decrypted block of the plurality of blocks of provisioning data in the non-volatile memory.

18 Claims, 5 Drawing Sheets

ELECTRONIC CHIP AND A METHOD FOR PROVISIONING SUCH AN ELECTRONIC CHIP

TECHNICAL FIELD

The invention relates to electronic chips for electronic equipment. More specifically, the invention relates to an electronic chip for electronic equipment and a method for provisioning such an electronic chip with security sensitive provisioning data.

BACKGROUND OF THE INVENTION

The production and assembly of state-of-the-art electronic equipment, such as smartphones, tablet computers as well as other types of electronic consumer or IoT equipment, often happens in a distributed fashion in that the various electronic components, including the electronic chips of electronic consumer equipment are manufactured, provisioned or personalized and finally assembled at different locations and by different parties. For instance, an electronic chip for an electronic equipment may be originally manufactured by a chip manufacturer and provisioned by another party with security sensitive provisioning data, such as cryptographic keys and/or a firmware, before being assembled into the final end product by the manufacturer of the electronic equipment, e.g. an OEM. A similar problem may arise in In-system programming (ISP), also called in-circuit serial programming (ICSP), where electronic components may be programmed, i.e. provided with security sensitive provisioning data, while already installed in an electronic equipment, rather than requiring the electronic component, e.g. electronic chip, to be programmed prior to installing it into the electronic equipment.

For provisioning data that is not security sensitive a provisioning apparatus (also referred to as a "programmer") may communicate via a communication interface with a non-volatile, in particular a Flash memory of the electronic chip (requiring no interaction with a CPU or microcontroller of the electronic chip) and write the data directly to the Flash memory of the electronic chip.

For provisioning security sensitive data, however, the data usually has to be transferred in encrypted form from the provisioning apparatus, i.e. the programmer to the electronic chip. This encrypted provisioning data has to be decrypted within the electronic chip before it can be stored in an executable form in the non-volatile memory thereof. Very often the security sensitive data is encrypted and decrypted using a block-based cryptography scheme. As a consequence thereof, the processing of this data within the electronic chip generally involves the following block-based steps: (a) an encrypted data block is transferred into a local volatile memory within the electronic chip; (b) the encrypted data block is decrypted (for instance, by a main CPU of the electronic chip) within the local volatile memory; and (c) the decrypted data block is written in an executable format into the permanent memory of the electronic chip. All of this requires that the main CPU of the electronic chip is operational during the provisioning process (either to perform the decryption of the data blocks directly or to control the flow of information between general purpose hardware accelerators of the electronic chip). Thus, the conventional provisioning process of an electronic chip is rather time consuming, which, in turn, results in increased production costs.

SUMMARY OF THE INVENTION

It is therefore an object of the invention to provide an electronic chip as well as a system and method for provisioning such an electronic chip allowing for a secure, but efficient provisioning of the electronic chip.

The foregoing and other objects are achieved by the subject matter of the independent claims. Further implementation forms are apparent from the dependent claims, the description and the figures.

According to a first aspect an electronic chip for being provisioned with security sensitive provisioning data is provided. The electronic chip comprises a communication interface configured to receive a plurality of blocks of the security sensitive provisioning data from a provisioning apparatus in encrypted form. The electronic chip further comprises a non-volatile memory configured to store the plurality of blocks of the security sensitive provisioning data, for instance, in executable decrypted form. Moreover, the electronic chip comprises a processing circuitry configured to perform a plurality of operations substantially in parallel. The plurality of operations comprise a first operation of decrypting a first encrypted block of the plurality of blocks of the security sensitive provisioning data and a second operation of writing a second decrypted block of the plurality of blocks of the security sensitive provisioning data in the non-volatile memory.

In an embodiment, the plurality of operations further comprises a third operation of providing a third encrypted block of the plurality of blocks of the security sensitive provisioning data from the communication interface to the processing circuitry for decrypting the third encrypted block of the plurality of blocks of the security sensitive provisioning data.

In an embodiment, the electronic chip further comprises a communication bus configured to transfer the plurality of blocks of the security sensitive provisioning data between the communication interface, the processing circuitry and the non-volatile memory.

In an embodiment, the electronic chip further comprises a volatile memory, wherein the volatile memory comprises a plurality of buffers, such as at least four buffers, wherein each buffer is configured to temporarily store one of the first encrypted block of the plurality of blocks of the security sensitive provisioning data, the second decrypted block of the plurality of blocks of the security sensitive provisioning data and the third encrypted block of the plurality of blocks of the security sensitive provisioning data.

In an embodiment, the electronic chip further comprises a buffer multiplexer configured to distribute the plurality of blocks of the security sensitive provisioning data between the plurality of buffers and the communication interface, the processing circuitry and the non-volatile memory of the electronic chip.

In an embodiment, the electronic chip further comprises a volatile memory, wherein the volatile memory comprises two FIFO buffers, wherein each FIFO buffer is configured to temporarily store at least two blocks of the first encrypted block of the plurality of blocks of the security sensitive provisioning data, the second decrypted block of the plurality of blocks of the security sensitive provisioning data and the third encrypted block of the plurality of blocks of the security sensitive provisioning data.

In an embodiment, the electronic chip further comprise a fuse device configured to disable the provisioning capability of the electronic chip once the electronic chip has been provisioned.

In an embodiment, the processing circuitry is configured to store the second decrypted block of the plurality of blocks of the security sensitive provisioning data in decrypted form in the non-volatile memory, as already described above. In a further embodiment, the processing circuitry is configured to re-encrypt the second decrypted block of the plurality of blocks of the security sensitive provisioning data (for instance, using a chip-specific key) and to store the second decrypted block of the plurality of blocks of the security sensitive provisioning data in re-encrypted form in the non-volatile memory.

According to a second aspect a method for provisioning an electronic chip with security sensitive provisioning data from a provisioning apparatus is provided. The method comprises the steps of:

receiving by a communication interface of the electronic chip a plurality of blocks of the security sensitive provisioning data from a provisioning apparatus in encrypted form;

performing a plurality of operations substantially in parallel, wherein the plurality of operations comprise a first operation of decrypting a first encrypted block of the plurality of blocks of provisioning data by a processing circuitry of the electronic chip and a second operation of writing a second decrypted block of the plurality of blocks of provisioning data in a non-volatile memory of the electronic chip.

In an embodiment, the plurality of operations further comprises a third operation of providing a third encrypted block of the plurality of blocks of the security sensitive provisioning data from the communication interface to the processing circuitry for decrypting the third encrypted block of the plurality of blocks of the security sensitive provisioning data.

In an embodiment, the method further comprises establishing a secure session between the electronic chip and the provisioning apparatus.

Embodiments of the invention can be implemented in hardware and/or software.

BRIEF DESCRIPTION OF THE DRAWINGS

Further embodiments of the invention will be described with respect to the following figures, wherein.

In the figures, identical reference signs will be used for identical or at least functionally equivalent features.

DETAILED DESCRIPTION OF EMBODIMENTS

In the following detailed description, reference is made to the accompanying drawings, which form part of the disclosure, and in which are shown, by way of illustration, specific aspects in which the present invention may be implemented. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
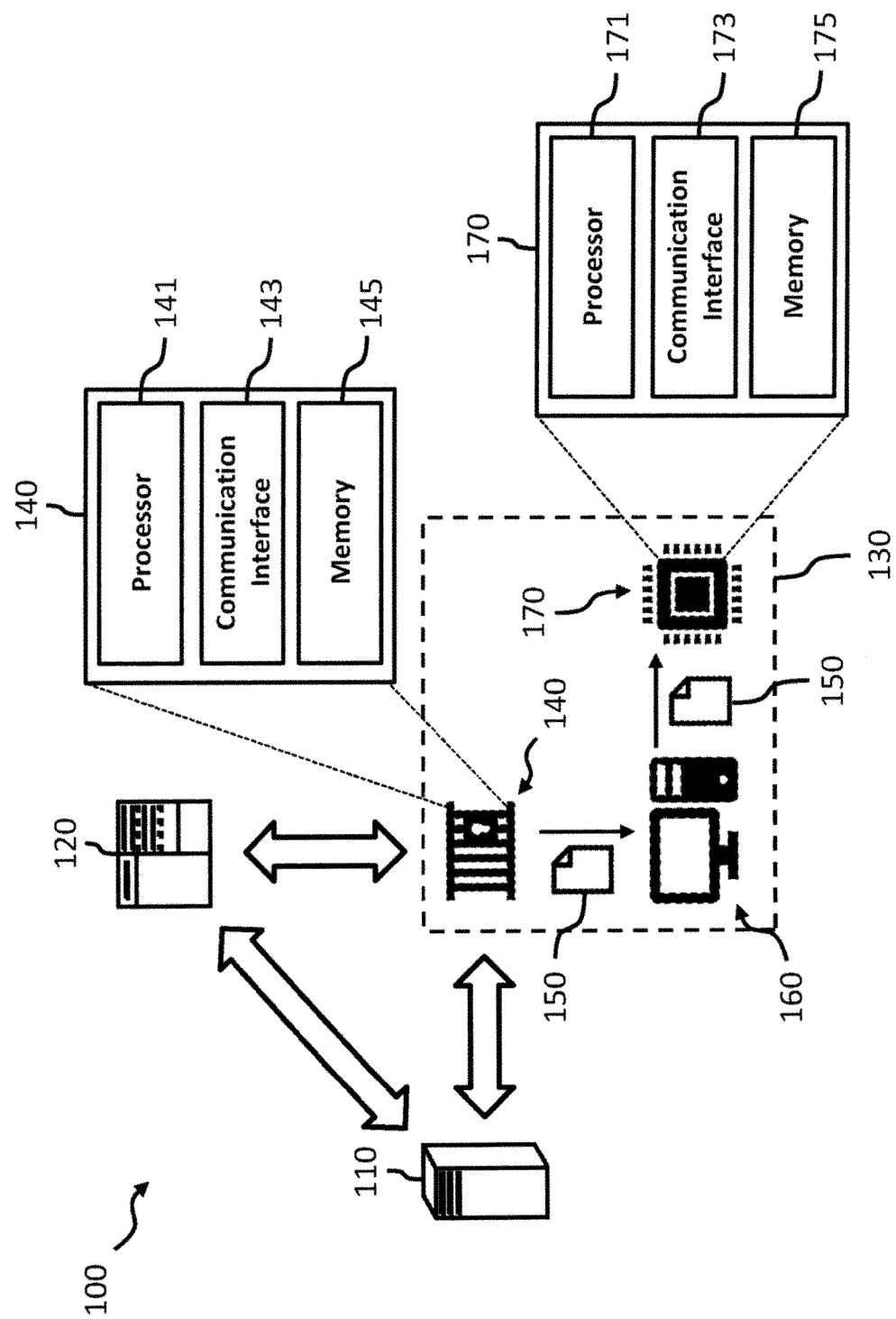
FIG. 1 shows a schematic diagram illustrating a provisioning system including a provisioning control apparatus and a provisioning apparatus for provisioning an electronic chip according to an embodiment of the invention.

FIG. 1 shows a schematic diagram of a provisioning system 100 for provisioning a plurality of electronic chips 170 according to an embodiment of the invention. As will be described in more detail further below, the provisioning system 100 may comprise a provisioning control apparatus 140, a remote server 110, a security server 120 and a provisioning apparatus 160 (also referred to as "programmer" 160) for provisioning or personalizing electronic chips or microprocessors 170 with security sensitive provisioning data 150, such as electronic keys, certificates and/or configuration data, in particular register settings.

As illustrated in FIG. 1, the provisioning control apparatus 140, the remote server 110 and the security server 120 may be configured to communicate with each other via a communication network, such as the Internet. Thus, the provisioning control apparatus 140, the remote server 110 and the security server 120 may be at different locations and under the control of different parties or entities. As illustrated in FIG. 1, the provisioning control apparatus 140 and the provisioning apparatus 160 may be located within a production environment 130, such as a personalization factory 130. In an embodiment, the remote server 110 may be under the control or associated with an electronic equipment manufacturer, e.g. an OEM, wherein the electronic equipment manufacturer assembles electronic equipment, such as smartphones, tablet computers or other types of IoT or electronic consumer equipment, using the electronic chips or microprocessors 170 provisioned by the provisioning apparatus 160 with the security sensitive provisioning data.

In an embodiment, the provisioning control apparatus 140, the remote server 110 and the security server 120 are configured to securely communicate with each other using one or more cryptographic schemes, such as a public key infrastructure and/or a hybrid cryptographic scheme. In an embodiment, the provisioning control apparatus 140 may be under the remote control of the security server 120.

The provisioning control apparatus 140 is configured to be coupled to the provisioning apparatus 160, for instance, by a wired or a wireless connection. In an embodiment, the provisioning apparatus 160 may be implemented as a personal computer and the provisioning control apparatus 140 may be implemented as a PC card inserted in the provisioning apparatus 160. The provisioning apparatus 160 may comprise an electrical and/or mechanical interface for interacting directly or indirectly via a provisioning equipment with the electronic chips 170. For instance, the provisioning apparatus 160 may comprise a personalization tray for personalizing a batch of electronic chips 170 inserted therein.

In the embodiment illustrated in FIG. 1 the provisioning control apparatus 140 may comprise a processor 141, a communication interface 143 and a non-volatile memory 145. As will be described in more detail in the following under further reference to FIG. 2, the communication interface 143 of the provisioning control apparatus 140 is configured to securely provide the provisioning data 150 to the provisioning apparatus 160 for storing the provisioning data 150 in the electronic chip 170.

In an embodiment, the communication interface 143 of the provisioning control apparatus 140 is configured to receive the provisioning data 150 from the remote OEM server 110 or the security server 120. In an embodiment, the communication interface 143 of the provisioning control apparatus 140 is further configured to receive at least a part of the provisioning data 150 in encrypted form. In an embodiment, the processor 141 of the provisioning control apparatus 140 is configured to generate at least a portion of the provisioning data 150. In an embodiment, the security sensitive provisioning data 150 comprises electronic keys, electronic key certificates and/or configuration data, in particular settings for one or more registers of the electronic chip 170.

Figure 2A:
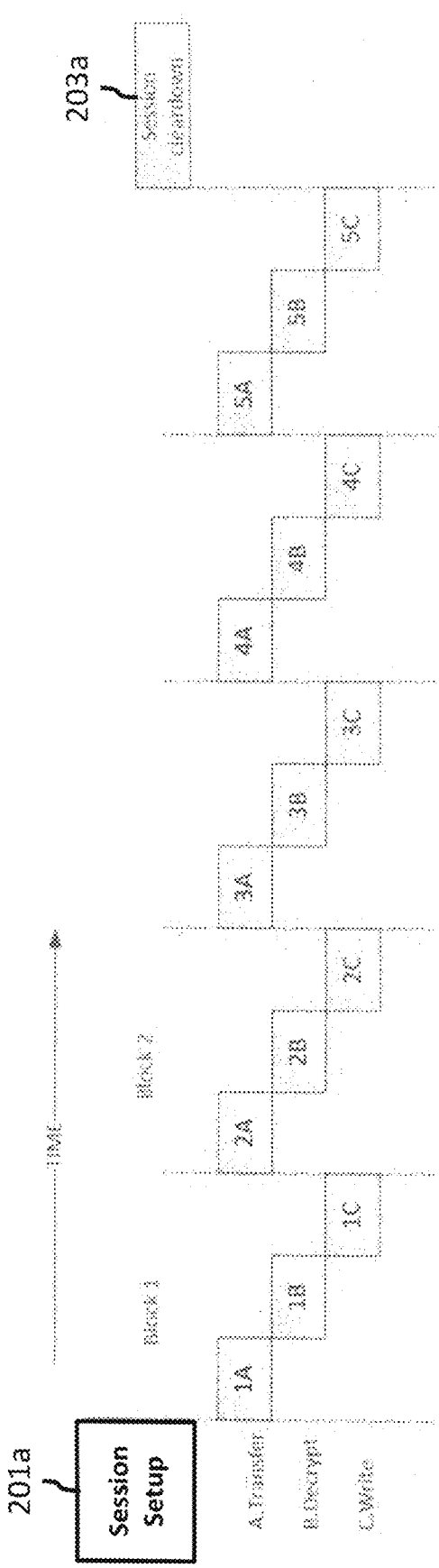
FIG. 2a shows a diagram illustrating the provisioning of a conventional electronic chip with blocks of security sensitive provisioning data.

FIG. 2a shows a diagram illustrating the provisioning of a conventional electronic chip with blocks of security sensitive provisioning data. As already described above, the security sensitive data may be encrypted and decrypted using a block-based cryptography scheme. As a consequence thereof, the processing of this data within a conventional electronic chip generally involves the following block-based provisioning steps (following a session setup 201a, which may involve the establishment of a secure key): (a) an encrypted data block (e.g. block 1 during stage 1A, block 2 during stage 2A and so on) is transferred into a local volatile memory within the electronic chip; (b) the encrypted data block (e.g. block 1 during stage 1B, block 2 during stage 2B and so on) is decrypted by a main CPU of the conventional electronic chip within the local volatile memory; and (c) the decrypted data block (e.g. block 1 during stage 1C, block 2 during stage 2C and so on) is written in an executable format into the permanent memory of the conventional electronic chip. These repeating provisioning stages (a), (b) and (c) may be completed by a session cleardown stage 203a. All of this requires that the main CPU of the conventional electronic chip is operational during the whole provisioning process (either to perform the decryption of the data blocks directly or to control the flow of information between general purpose hardware accelerators of the electronic chip). As will be appreciated from FIG. 2a, the conventional provisioning process of an electronic chip is rather time consuming, which, in turn, results in increased production costs.

Figure 2B:
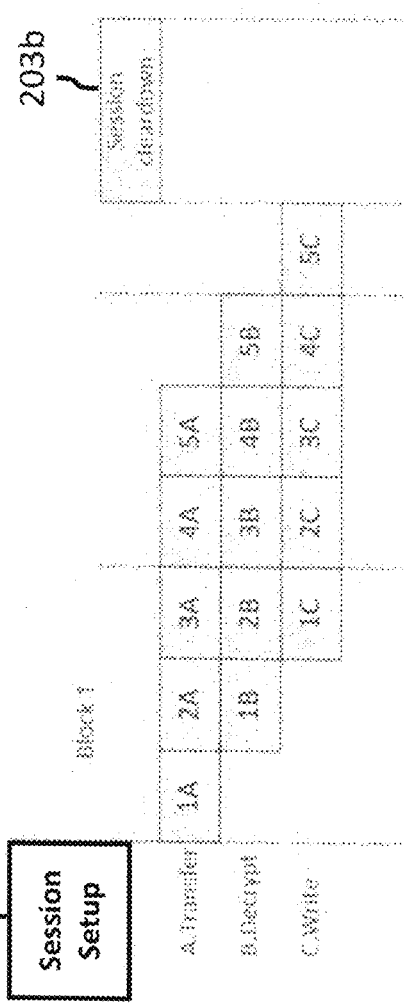
FIG. 2b shows a diagram illustrating the provisioning of an electronic chip according to an embodiment with blocks of security sensitive provisioning data.
Figure 3:
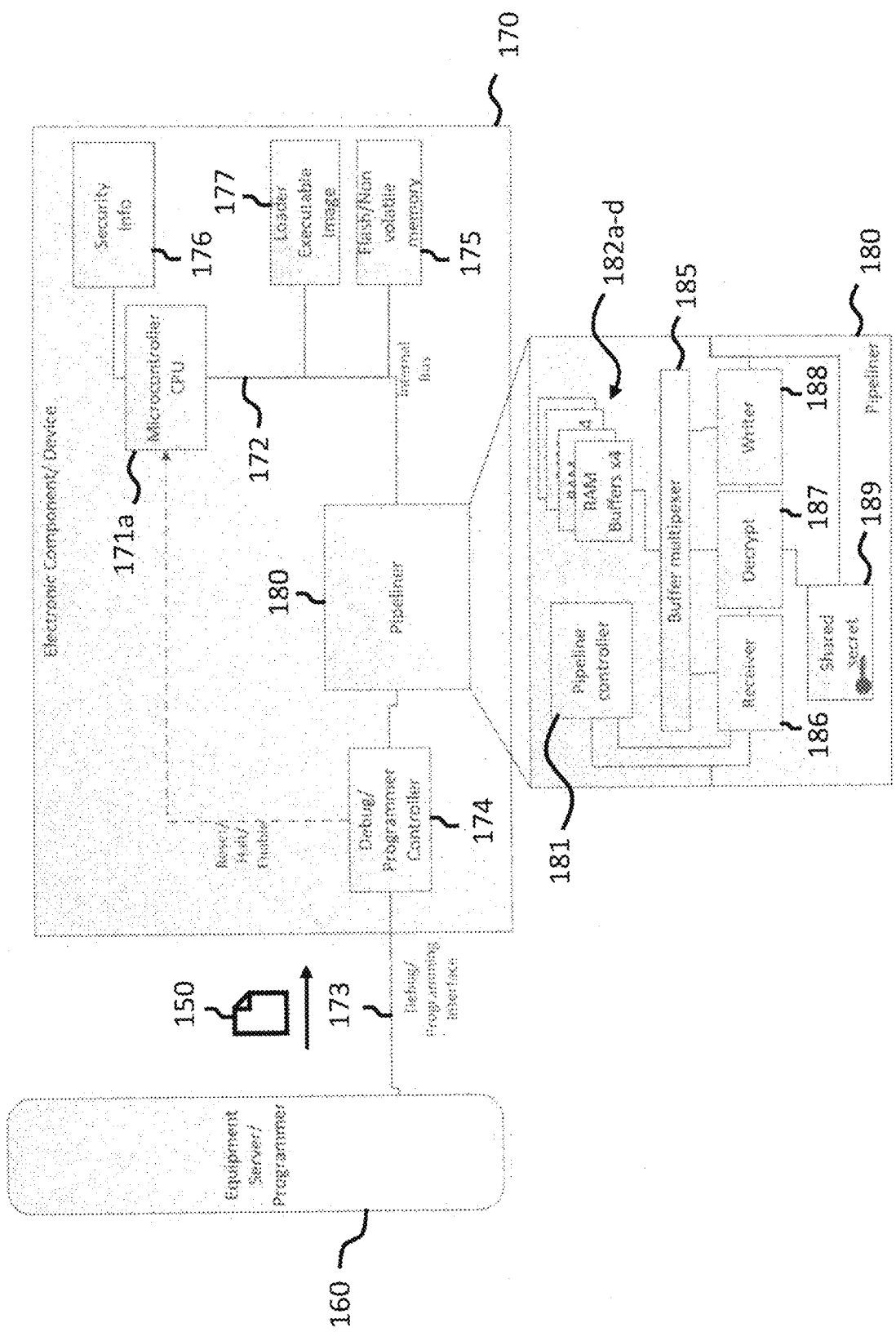
FIG. 3 shows a schematic diagram illustrating the architecture of an electronic chip according to an embodiment.
Figure 4:
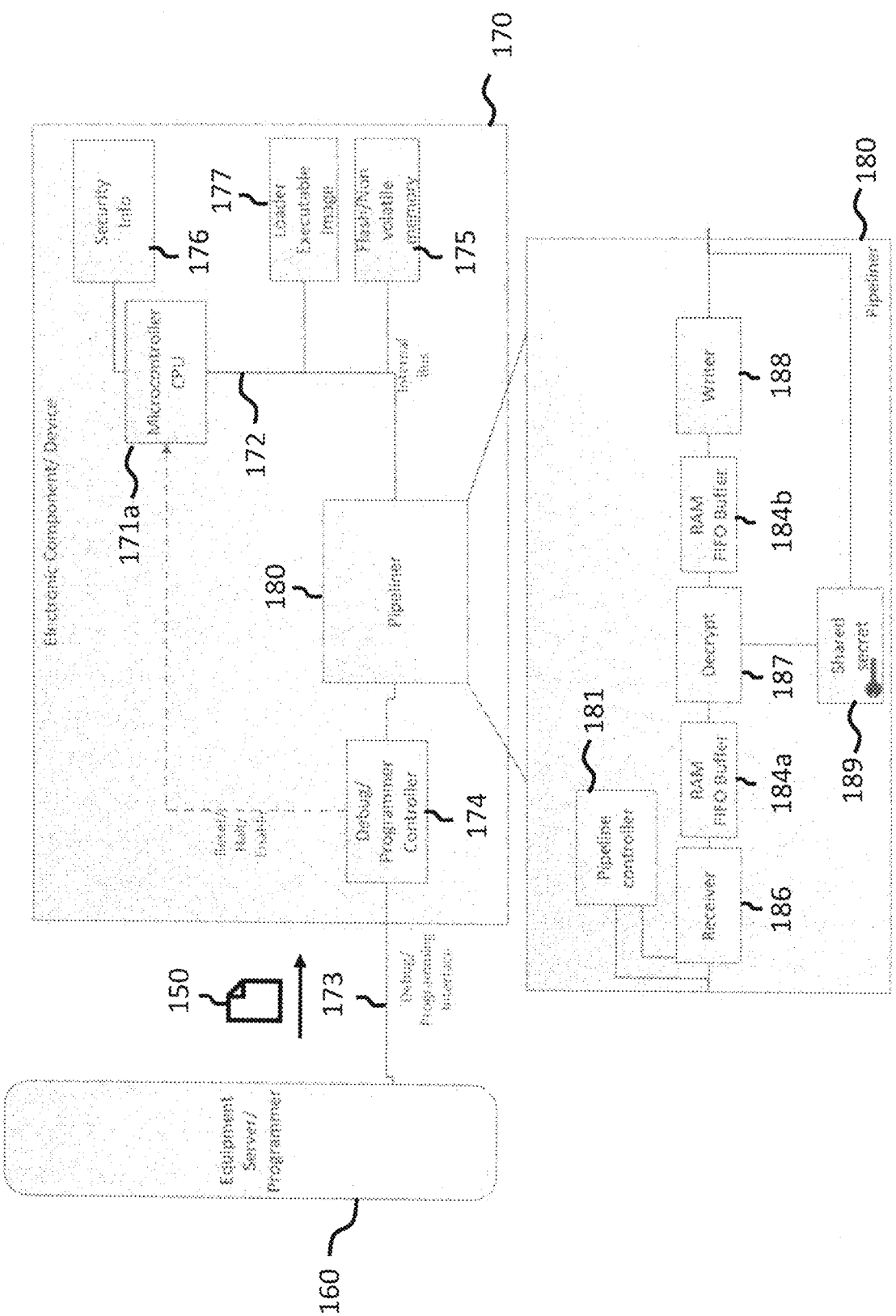
FIG. 4 shows a schematic diagram illustrating the architecture of an electronic chip according to a further embodiment.

FIG. 2b shows a diagram illustrating the provisioning procedure of an electronic chip 170 according to an embodiment with blocks of security sensitive provisioning data 150. FIGS. 3 and 4 show in more detail the architecture of the electronic chip 170 according to two embodiments for implementing the provisioning procedure illustrated in FIG. 2b. As will be described in more detail in the following in the context of FIGS. 2b, 3 and 4, the communication interface 173 of the electronic chip 170 is configured to receive (following a session setup 201b, which may involve the establishment of a secure key) a plurality of blocks of the security sensitive provisioning data 150 from the provisioning apparatus 160 in encrypted form and the non-volatile memory 175 of the electronic chip 170 is configured to store the plurality of blocks of the security sensitive provisioning data 150, for instance, in executable decrypted form.

As illustrated in FIG. 2b, the processing circuitry 171 of the electronic chip 170 is configured to perform a plurality of operations substantially in parallel, including a first operation of decrypting a first encrypted block of the plurality of blocks of the security sensitive provisioning data 150 (such as block 1 during stage 1B, block 2 during stage 2B and so on) and a second operation of writing a second decrypted block of the plurality of blocks of the security sensitive provisioning data 150 (such as block 1 during stage 1C, block 2 during stage 2C and so on) in the non-volatile memory 175 of the electronic chip. In an embodiment, the processing circuitry 171 may be configured to re-encrypt the second decrypted block of the plurality of blocks of the security sensitive provisioning data 150 and to store the second decrypted block of the plurality of blocks of the security sensitive provisioning data 150 in re-encrypted form in the non-volatile memory 175.

In the embodiment shown in FIG. 2b, the plurality of operations further comprise a respective third operation of providing a third encrypted block of the plurality of blocks of the security sensitive provisioning data 150 (such as block 1 during stage 1A, block 2 during stage 2A and so on) from the communication interface 173 to the processing circuitry 171 for decrypting the third encrypted block of the plurality of blocks of the security sensitive provisioning data 150. As will appreciated, from FIG. 2b, these stages/operations are performed substantially in parallel so that the whole provisioning process takes much less time as the provisioning process of a conventional electronic chip illustrated in FIG. 2a.

As already mentioned above, FIGS. 3 and 4 show in more detail the architecture of the electronic chip 170 according to two embodiments for implementing the advantageous provisioning procedure illustrated in FIG. 2b. In the embodiments shown in FIGS. 3 and 4 the electronic chip 170 comprises a pipeline unit 180 (or "pipeliner" 180), which may be implemented in hardware and/or software and which comprises a pipeline controller 181. In an embodiment, the pipeline controller 181 may be implemented as a state machine by a CPU 171a as part of the processing circuitry 171 of the electronic chip 170. In an embodiment, the pipeline controller 181 is configured to receive and process the requests, e.g. instructions from the provisioning apparatus, i.e. the programmer 160 via the communication interface 173 and a programmer controller 174. As illustrated in FIGS. 3 and 4, the pipeline controller 181 is configured to control three logical units or stages for performing a respective stage for provisioning the electronic chip 170, namely a receiver unit 186, a decryption unit 187 and a writer unit 188, whose functions will be described in more detail in the following. In an embodiment, the receiver unit 186, the decryption unit 187 and/or the writer unit 188 may at least partially be implemented by the CPU 171a of the electronic chip 170.

The receiver unit 186 is configured to receive a first block of encrypted data from the programmer 160 via the communication interface 173 (also referred to as debug interface 173 herein) and possibly the programmer controller 174. In an embodiment, the programmer controller 174, which may be a stand-alone hardware component or at least partially implemented by the CPU 171a of the electronic chip 170, may be configured to check the integrity of the data block, that it has been transferred to the electronic chip 170 correctly and reporting the status back to the programmer 160 via the communication interface 173.

In the embodiment shown in FIG. 3, the decryption unit 187 is configured to decrypt a block of encrypted provisioning data (which has been successfully received by the receiver unit 186) using a shared session key 189 or a key transferred to the electronic chip 170 using the shared session key 189. Once decrypted the resulting decrypted, i.e. "plaintext" provisioning data is passed (by the pipeline controller 181) to the writer unit 188.

In the embodiment shown in FIG. 3, the writer unit 188 is configured to transfer under the control of the pipeline controller 181 the decrypted, i.e. "plaintext" provisioning data provided by the decryption unit 187 to the non-volatile memory 175 of the electronic chip 170 and to store this data therein in such a way that it may be executed by the processor 171 of the electronic chip 170. In an embodiment, this may include handling the restrictions to write to the non-volatile memory 175, such as meeting access conditions and timings. As already described above, in a further embodiment, the "plaintext" provisioning data provided by the decryption unit 187 may be stored in the non-volatile memory 175 in a re-encrypted form.

In order to operate correctly the provisioning data 150 has to be passed between the programmer 160 and the three main stages of the pipeline unit 180, namely the receiver stage/unit 186, the decryption stage/unit 187 and the writer stage/unit 188, and the non-volatile memory 175 of the electronic chip 170. As already described above, according to embodiments of the invention this is performed in a manner which does not block and thereby slow down the operation of the three independent stages of the pipeline unit 180, which, thus, may genuinely operate in parallel. Moreover, embodiments disclosed herein allow minimizing the overhead due to copying of data within the electronic chip 170.

In the embodiment shown in FIG. 3, the pipeline unit 180 comprises a buffer multiplexer 185 and a plurality of scratch pad memories 182a-d (also referred to as RAM Buffers 182a-d in FIG. 3 and in the following). In an embodiment, the pipeline unit 180 may comprise at least four scratch pad memories 182a-d. Each of the scratch pad memories 182a-d may be used individually or pairwise by the three main processing stages implemented by the pipeline unit 180, namely the receiver stage 186, the decryption stage 187 and the writer stage 188. During operation, at any point in time one RAM buffer 182a-d may be used by the receiver stage 186, two RAM buffers 182a-d may be used by the decryption stage 187 and one RAM buffer 182a-d may be used by the writer stage 188.

The buffer multiplexer 185 is configured to ensure that each of at least four RAM buffers 182a-d is only accessible at a time by one of the three main processing stages implemented by the pipeline unit 180, namely the receiver stage 186, the decryption stage 187 and the writer stage 188. This is controlled by the pipeline unit 180 to operate which processing stage has access to which buffer 182a-d to ensure that firstly no stages access the same buffer at the same time, and that data is moved between the various processing stages in the correct order.

A variant of the embodiment of the pipeline unit 180 shown in FIG. 3 is shown in FIG. 4 based on the use of two dedicated local FIFO buffers 184a, 184b between the three main processing stages 186, 187 and 188 of the pipeline unit 180 instead of the at least four RAM buffers 182a-d used in the embodiment shown in FIG. 3. In an embodiment, the size of each local FIFO buffers 184a, 184b is as at least twice as large as the provisioning data block in order to prevent blocking of the provisioning pipeline.

In the following the provisioning of the electronic chip 170 according to the embodiments shown in FIGS. 3 and 4 will be described in more detail.

The provisioning apparatus 160 sets up a secure communication channel with the electronic chip 170. As will be appreciated, the details of setting up such a secure communication channel may depend on the particular type of the electronic chip 170, but may include the following processing steps.

The provisioning apparatus 160, i.e. programmer 160 sends a request to the programmer controller 174 within the electronic chip 170 via the communication interface 173 to setup a secure session.

The programmer controller 174 informs the CPU 171a to implement and start the secure session. To this end, the CPU 171a of the electronic device 170 processes program code for implementing the secure session. In an embodiment, the secure session program code may be a secure session loader executable image handled by a loader 177, as illustrated in FIG. 3. In an embodiment, the secure session loader executable image handled by the loader 177 may be stored in the non-volatile memory 175. The electronic chip 170 may further comprise a communication bus 172 configured to transfer the plurality of blocks of the security sensitive provisioning data 150 between the communication interface 173, the CPU 171a and the non-volatile memory 175.

The CPU 171a of the processing circuitry 171 of the electronic chip 170 and the provisioning apparatus 160 may further perform a mutual authentication and establish a shared session key 189. This may be done using an exchange of commands and responses between the CPU 171a and the provisioning apparatus 160 via the communication interface 173 and the programmer controller 174.

The provisioning apparatus 160 and the CPU 171a of the electronic chip 170 may further agree on parameters of the provisioning during the secure session, such as the number and/or the size of the blocks of security sensitive provisioning data 150 to be provided by the provisioning apparatus 160.

In an embodiment, the provisioning data 150 may be originally provided to the provisioning apparatus 160 as an image of provisioning data 150. In an embodiment, the provisioning apparatus 160 may further be configured to ensure that the image or provisioning data 150 to be transferred to the electronic chip 170 is sliced up into the plurality of blocks of provisioning data 150 such that each block does not exceed the maximum size the loader 177 of the electronic chip 170 is expecting. This maximum block size may be defined as part of a specification of the electronic chip 170 or during the setup session between the provisioning apparatus 160 and the electronic chip 170. In an embodiment, the provisioning apparatus 160 may be configured to slice the image itself into the plurality of blocks or receive the images in a pre-sliced form, i.e. in the form of a plurality of blocks.

The CPU 171a of the processing circuitry 171 of the electronic chip 170 may activate and reset the components of the pipeline unit 180. For instance, in the embodiment shown in FIG. 3, the CPU 171a of the electronic chip 170 may set up at least one of the RAM buffers 182a-d for receiving the first encrypted block of security sensitive provisioning data 150 and enabling the receiver unit 186.

Furthermore, the CPU 171a may transfer configuration information 176 to the pipeline unit 180. In an embodiment, this configuration information 176 may include the session key 189 as well as information about the provisioning parameters, e.g. information about the number and/or the size of the blocks of security sensitive provisioning data 150 that is provided to the pipeline controller 181.

Moreover, the CPU 171 of the electronic chip 170 may inform the provisioning apparatus 160 that the secure session has been established and that the transfer of blocks of provisioning data 150 may commence. The provisioning apparatus 160 may obtain the first block of provisioning data 150 from the image, provide this first block to the electronic chip 170 and repeat this until the whole image has been provided to the electronic chip 170.

More specifically, once the secure session has been established and the transfer of blocks of security sensitive provisioning data 150 from the provisioning apparatus 160 to the electronic chip 170 has commenced, each active main stage of the pipeline unit 180 is configured to process independently and in parallel one block of security sensitive provisioning data 150 at a time, as illustrated in FIG. 2b.

In an embodiment, each processing stage of the pipeline unit 180, i.e. the receiver stage 186, the decryption stage 187 and the writer stage 188 are configured to report status information back to the pipeline controller 180. This status information may include information about the number of blocks of provisioning data 150 processed and transferred by each stage 186, 187, 188, an acknowledgement that a block of provisioning data 150 has been completely processed and/or error indications.

For the embodiment shown in FIG. 3, the operations are controlled by the pipeline controller 181 and operate on a "completion tick". The completion tick is deemed to have occurred when all of the three main processing stages of the pipeline unit 180, i.e. the receiver stage 186, the decryption stage 187 and the writer stage 188, which are active, have completed their respective operation on their currently processed block of security sensitive provisioning data 150. When the tick is complete, the pipeline controller 180 re-configures the RAM buffer multiplexer 185 and then triggers the three main processing stages of the pipeline unit 180, i.e. the receiver stage 186, the decryption stage 187 and the writer stage 188, to process their next respective block of security sensitive provisioning data 150 in line (provided sufficient provisioning data 150 is still in the pipeline, i.e. whether all blocks have been already processed by the component). In an embodiment, for the receiver stage 186 this may include acknowledging the last block received.

In the embodiment shown in FIG. 4 (making use of the two RAM FIFO buffers 184a, 184b), each of the three main processing stages of the pipeline unit 180, i.e. the receiver stage 186, the decryption stage 187 and the writer stage 188 may operate more independently than in the embodiment shown in FIG. 3, i.e. less control by the pipeline controller 181 is required. Generally, in the embodiment shown in FIG. 4, the three main processing stages of the pipeline unit 180 will only perform an operation when there is both a complete block in the input buffer to process and space in the output buffer to store a complete result.

More specifically, in an embodiment, once the pipeline unit 180 and hence the receiver unit 186 has been activated in the way described above, its output buffer, i.e. the first RAM FIFO buffer 184a will be empty. Therefore, the receiver unit 186 is capable of receiving provisioning data 150 from the provisioning apparatus 160 via the communication interface 173 (and possibly the programmer controller 174). Upon reception of data 150 the receiver unit 186 places up to a block worth of data into its output buffer, i.e. the first RAM FIFO buffer 184a. When there is sufficient space in its output buffer, i.e. the first RAM FIFO buffer 184a, the receiver unit 186 will inform the provisioning apparatus 160 that it can receive the next block of encrypted security sensitive provisioning data 150.

The decryption unit 187 will become active, i.e. start operating once there is a complete block of encrypted provisioning data 150 in its input, i.e. the first RAM FIFO buffer 184a and sufficient space in its output buffer, i.e. the second RAM FIFO buffer 184b to hold a complete block of decrypted provisioning data 150.

The write unit 188 will only activate itself when there is a complete block of decrypted provisioning data 150 in its input buffer, i.e. the second RAM FIFO buffer 184b.

Upon completion of transferring a final block of the provisioning data 150 to the receiver unit 186 the provisioning apparatus 160 will be able to read whether all processing has been completed by requesting a status from the pipeline controller 181 via the communication interface 173 (and possibly the programmer controller 174). In an embodiment, the pipeline controller 181 will only indicate that it has finished processing to the provisioning apparatus 160, if all of the three main processing stages of the pipeline unit 180, i.e. the receiver stage 186, the decryption stage 187 and the writer stage 188 have processed all of the blocks of provisioning data 150.

Once the provisioning apparatus 160 has been informed that the transfer of provisioning data 150 is complete the secure provisioning session may be cleared down (see stage 203b in FIG. 2b). In an embodiment, this may involve that the provisioning apparatus 160 signals via the communication interface 173 to the programmer controller 174 to reset the CPU 171a of the electronic chip 170 and by doing so erasing the shared session key 189. Alternatively, the pipeline controller 181 may be configured to inform the CPU 171a of the electronic chip 170 that the session is complete and deactivate itself (including erasing the shared session key 189).

As will be appreciated, in an embodiment, the pipeline unit 180 and its pipeline controller 181 may be specifically configured for the speeding up of the provisioning process within the provisioning environment 130. As it may be risky to leave the pipeline unit 180 active after the electronic chip 170 has been fully provisioned, because it could be used incorrectly or by a hacker to attempt to compromise the electronic chip 170, according to embodiments the pipeline unit 180 may be irreversibly disabled after the electronic chip 170 has been fully provisioned. For instance, in an embodiment, the electronic chip may comprise an OTP fuse configured to be blown up after the provisioning procedure has been completed for permanently disabling the pipeline unit 180.

Figure 5:
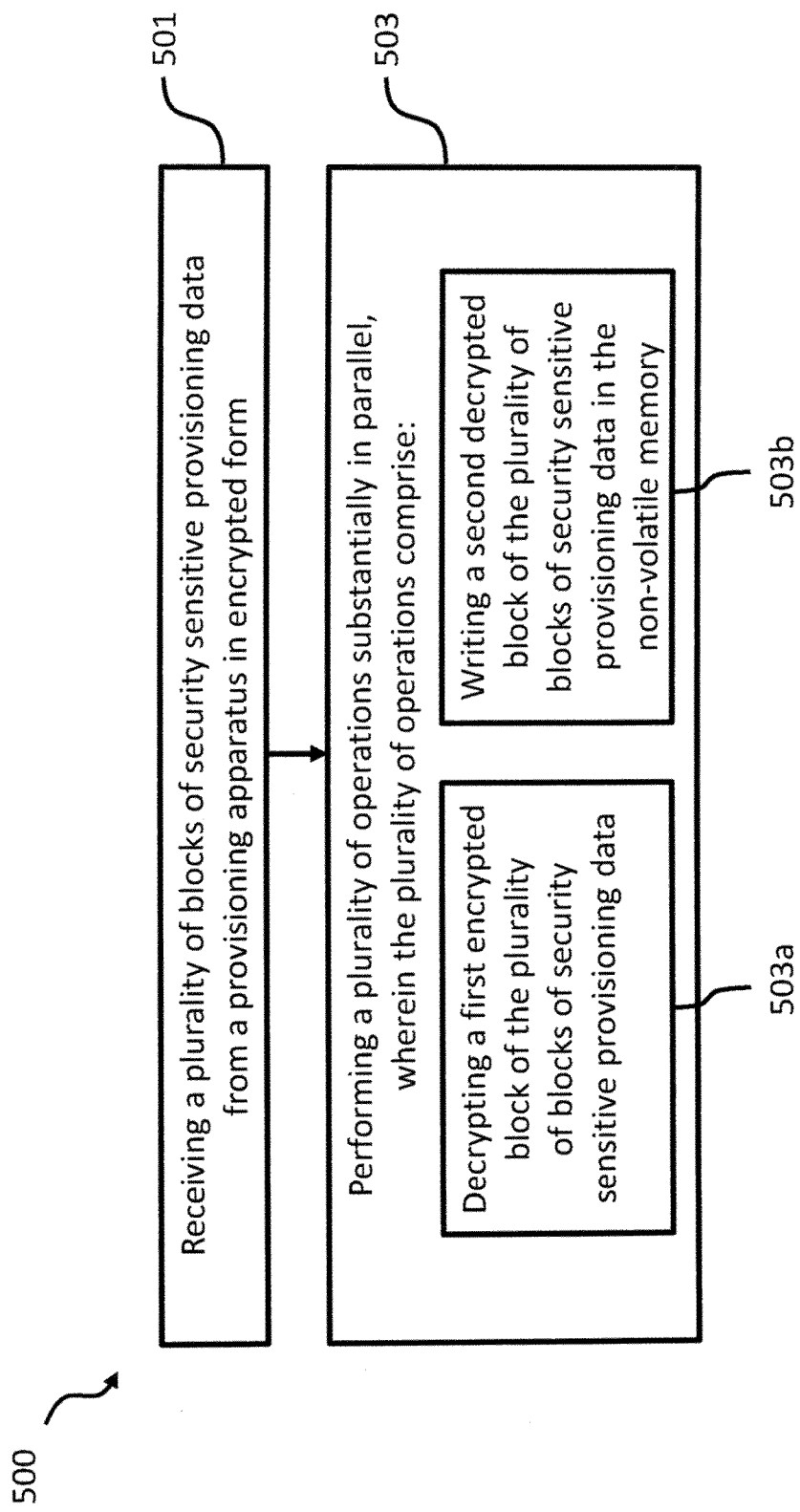
FIG. 5 shows a flow diagram illustrating steps of a provisioning method according to an embodiment for provisioning an electronic chip according to an embodiment with blocks of security sensitive provisioning data.

FIG. 5 shows a flow diagram illustrating steps of a provisioning method 500 according to an embodiment of the invention. The method 500 comprises a step 501 of receiving a plurality of blocks of the security sensitive provisioning data 150 from the provisioning apparatus 160 in encrypted form. Moreover, the method 500 comprises a step 503 of performing a plurality of operations substantially in parallel, wherein the plurality of operations comprise a first operation 503a of decrypting a first encrypted block of the plurality of blocks of provisioning data 150 and a second operation 503b of writing a second decrypted block of the plurality of blocks of provisioning data 150 in the non-volatile memory 175 of the electronic chip 170.

In an embodiment, the plurality of operations performed in step 503 of the method 500 further comprises a third operation of providing a third encrypted block of the plurality of blocks of the security sensitive provisioning data 150 from the communication interface 173 to the processing circuitry 171 of the electronic chip 170 for decrypting the third encrypted block of the plurality of blocks of the security sensitive provisioning data 150.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application.

Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. An electronic chip for being provisioned with security sensitive provisioning data, the electronic chip comprising:
 a communication interface configured to receive a plurality of blocks of the security sensitive provisioning data from a provisioning apparatus in encrypted form;
 a non-volatile memory configured to store the plurality of blocks of the security sensitive provisioning data; and
 a processing circuitry configured to perform a plurality of operations in parallel, wherein the plurality of operations comprises a first operation of decrypting a first encrypted block of the plurality of blocks of the security sensitive provisioning data and a second operation of writing a second decrypted block of the plurality of blocks of the security sensitive provisioning data in the non-volatile memory,
 wherein the plurality of operations further comprises a third operation of providing a third encrypted block of the plurality of blocks of the security sensitive provisioning data from the communication interface to the processing circuitry for decrypting the third encrypted block of the plurality of blocks of the security sensitive provisioning data, and
 wherein the electronic chip further comprises a volatile memory and wherein the volatile memory comprises two FIFO buffers, wherein each FIFO buffer is configured to temporarily store at least two of the first encrypted block of the plurality of blocks of the security sensitive provisioning data, the second decrypted block of the plurality of blocks of the security sensitive provisioning data and the third encrypted block of the plurality of blocks of the security sensitive provisioning data.

2. The electronic chip of claim 1, wherein the electronic chip further comprises a communication bus configured to transfer the plurality of blocks of the security sensitive provisioning data between the communication interface, the processing circuitry and the non-volatile memory.

3. The electronic chip of claim 1, wherein the electronic chip further comprises a fuse device configured to disable the provisioning capability of the electronic chip once the electronic chip has been provisioned.

4. The electronic chip of claim 1, wherein the processing circuitry is configured to store the second decrypted block of the plurality of blocks of the security sensitive provisioning data in decrypted form in the non-volatile memory.

5. The electronic chip of claim 1, wherein the processing circuitry is configured to re-encrypt the second decrypted block of the plurality of blocks of the security sensitive provisioning data and to store the second decrypted block of the plurality of blocks of the security sensitive provisioning data in re-encrypted form in the non-volatile memory.

6. An electronic chip for being provisioned with security sensitive provisioning data, the electronic chip comprising:
 a communication interface configured to receive a plurality of blocks of the security sensitive provisioning data from a provisioning apparatus in encrypted form;
 a non-volatile memory configured to store the plurality of blocks of the security sensitive provisioning data; and
 a processing circuitry configured to perform a plurality of operations in parallel, wherein the plurality of operations comprises a first operation of decrypting a first encrypted block of the plurality of blocks of the security sensitive provisioning data and a second operation of writing a second decrypted block of the plurality of blocks of the security sensitive provisioning data in the non-volatile memory,
 wherein the plurality of operations further comprises a third operation of providing a third encrypted block of the plurality of blocks of the security sensitive provisioning data from the communication interface to the processing circuitry for decrypting the third encrypted block of the plurality of blocks of the security sensitive provisioning data, and
 wherein the electronic chip further comprises a volatile memory and wherein the volatile memory comprises a plurality of buffers, wherein each buffer is configured to temporarily store one of the first encrypted block of the plurality of blocks of the security sensitive provisioning data, the second decrypted block of the plurality of blocks of the security sensitive provisioning data and the third encrypted block of the plurality of blocks of the security sensitive provisioning data.

7. The electronic chip of claim 6, wherein the electronic chip further comprises a buffer multiplexer configured to distribute the plurality of blocks of the security sensitive provisioning data between the plurality of buffers and the communication interface, the processing circuitry and the non-volatile memory of the electronic chip.

8. The electronic chip of claim 6, wherein the electronic chip further comprises a communication bus configured to transfer the plurality of blocks of the security sensitive provisioning data between the communication interface, the processing circuitry and the non-volatile memory.

9. The electronic chip of claim 6, wherein the electronic chip further comprises a fuse device configured to disable the provisioning capability of the electronic chip once the electronic chip has been provisioned.

10. The electronic chip of claim 6, wherein the processing circuitry is configured to store the second decrypted block of the plurality of blocks of the security sensitive provisioning data in decrypted form in the non-volatile memory or wherein the processing circuitry is configured to re-encrypt the second decrypted block of the plurality of blocks of the security sensitive provisioning data and to store the second decrypted block of the plurality of blocks of the security sensitive provisioning data in re-encrypted form in the non-volatile memory.

11. A method for provisioning an electronic chip with security sensitive provisioning data from a provisioning apparatus, the method comprising:
  receiving by a communication interface of the electronic chip a plurality of blocks of the security sensitive provisioning data from a provisioning apparatus in encrypted form;
  performing a plurality of operations in parallel, wherein the plurality of operations comprises a first operation of decrypting a first encrypted block of the plurality of blocks of provisioning data by a processing circuitry of the electronic chip and a second operation of writing a second decrypted block of the plurality of blocks of provisioning data in a non-volatile memory of the electronic chip,
  wherein the plurality of operations further comprises a third operation of providing a third encrypted block of the plurality of blocks of the security sensitive provisioning data from the communication interface to the processing circuitry for decrypting the third encrypted block of the plurality of blocks of the security sensitive provisioning data, and
  wherein the electronic chip further comprises a volatile memory and wherein the volatile memory comprises two FIFO buffers, wherein each FIFO buffer is configured to temporarily store at least two of the first encrypted block of the plurality of blocks of the security sensitive provisioning data, the second decrypted block of the plurality of blocks of the security sensitive provisioning data and the third encrypted block of the plurality of blocks of the security sensitive provisioning data.

12. The method of claim 11, wherein the method further comprises establishing a secure session between the electronic chip and the provisioning apparatus.

13. The method of claim 11, wherein the electronic chip further comprises a communication bus, and
  wherein the method further comprises the communication bus transferring the plurality of blocks of the security sensitive provisioning data between the communication interface, the processing circuitry, and the non-volatile memory.

14. The method of claim 11, wherein the electronic chip further comprises a fuse device, and
  wherein the method further comprises the fuse device disabling a provisioning capability of the electronic chip once the electronic chip has been provisioned.

15. The method of claim 11, further comprising the processing circuitry storing the second decrypted block of the plurality of blocks of the security sensitive provisioning data in decrypted form in the non-volatile memory.

16. The method of claim 11, further comprising the processing circuitry re-encrypting the second decrypted block of the plurality of blocks of the security sensitive provisioning data and storing the second decrypted block of the plurality of blocks of the security sensitive provisioning data in re-encrypted form in the non-volatile memory.

17. A method for provisioning an electronic chip with security sensitive provisioning data from a provisioning apparatus, the method comprising:
  receiving by a communication interface of the electronic chip a plurality of blocks of the security sensitive provisioning data from a provisioning apparatus in encrypted form;
  performing a plurality of operations in parallel, wherein the plurality of operations comprises a first operation of decrypting a first encrypted block of the plurality of blocks of provisioning data by a processing circuitry of the electronic chip and a second operation of writing a second decrypted block of the plurality of blocks of provisioning data in a non-volatile memory of the electronic chip,
  wherein the plurality of operations further comprises a third operation of providing a third encrypted block of the plurality of blocks of the security sensitive provisioning data from the communication interface to the processing circuitry for decrypting the third encrypted block of the plurality of blocks of the security sensitive provisioning data, and
  wherein the electronic chip further comprises a volatile memory and wherein the volatile memory comprises a plurality of buffers, wherein each buffer is configured to temporarily store one of the first encrypted block of the plurality of blocks of the security sensitive provisioning data, the second decrypted block of the plurality of blocks of the security sensitive provisioning data and the third encrypted block of the plurality of blocks of the security sensitive provisioning data.

18. The method of claim 12, wherein the method further comprises establishing a secure session between the electronic chip and the provisioning apparatus.

* * * * *